United States Patent [19]

Books et al.

[11] 4,117,551
[45] Sep. 26, 1978

[54] PURGEABLE DISPENSING GUN FOR POLYURETHANE FOAM AND THE LIKE

[75] Inventors: William R. Brooks, 1 S. 549 Forest Trail, Oak Brook, Ill. 60521; Irving C. Heinzel, Des Plaines, Ill.

[73] Assignee: William R. Brooks, Oak Brook, Ill.

[21] Appl. No.: 591,174

[22] Filed: Jun. 27, 1975

Related U.S. Application Data

[63] Continuation-in-part of Ser. No. 474,381, May 30, 1974, abandoned.

[51] Int. Cl.$^2$ .............................................. B05B 7/12
[52] U.S. Cl. ................................ 366/162; 366/320; 366/339; 222/148; 239/414
[58] Field of Search ................ 222/148; 259/4, 7, 18, 259/22; 239/106, 112, 414, 416; 366/339, 162, 320

[56] References Cited

U.S. PATENT DOCUMENTS

| | | | |
|---|---|---|---|
| 1,508,944 | 9/1924 | Simon | 251/346 |
| 1,770,232 | 7/1930 | Fegley | 251/346 |
| 2,459,048 | 1/1949 | Schwartz et al. | 259/95 |
| 3,504,855 | 4/1970 | Volker | 239/112 |
| 3,690,557 | 9/1972 | Higgins | 239/112 |
| 3,784,110 | 1/1974 | Brooks | 239/414 |
| 3,790,030 | 2/1974 | Ives | 222/148 |
| 3,837,575 | 9/1974 | Lehnert | 239/112 |

Primary Examiner—Richard E. Aegerter
Assistant Examiner—John W. Shepperd
Attorney, Agent, or Firm—Olson, Trexler, Wolters, Bushnell & Fosse, Ltd.

[57] ABSTRACT

A gun is disclosed for mixing and dispensing a settable fluid product having separately stored constituents. The gun has primary valves for controlling the flow of product fluid constituents along separate primary paths and into a common mixing and dispensing nozzle. A secondary valve permits the flow of a purge fluid along secondary passages, past the primary valves, along at least parts of the primary passages and through the nozzle. According to an important aspect of the invention, a disposable nozzle is arranged with separate, independently operable valves contained therein for isolating the interaction of the product constituents to the nozzle.

7 Claims, 9 Drawing Figures

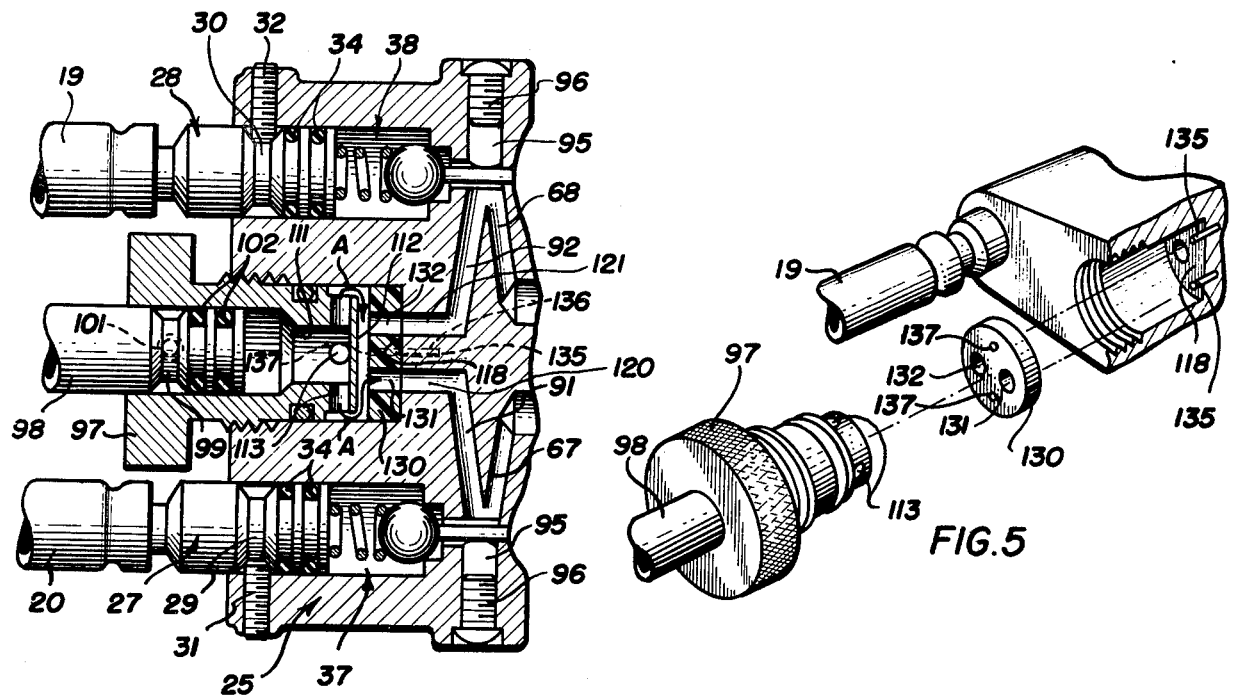
FIG. 4
FIG. 5
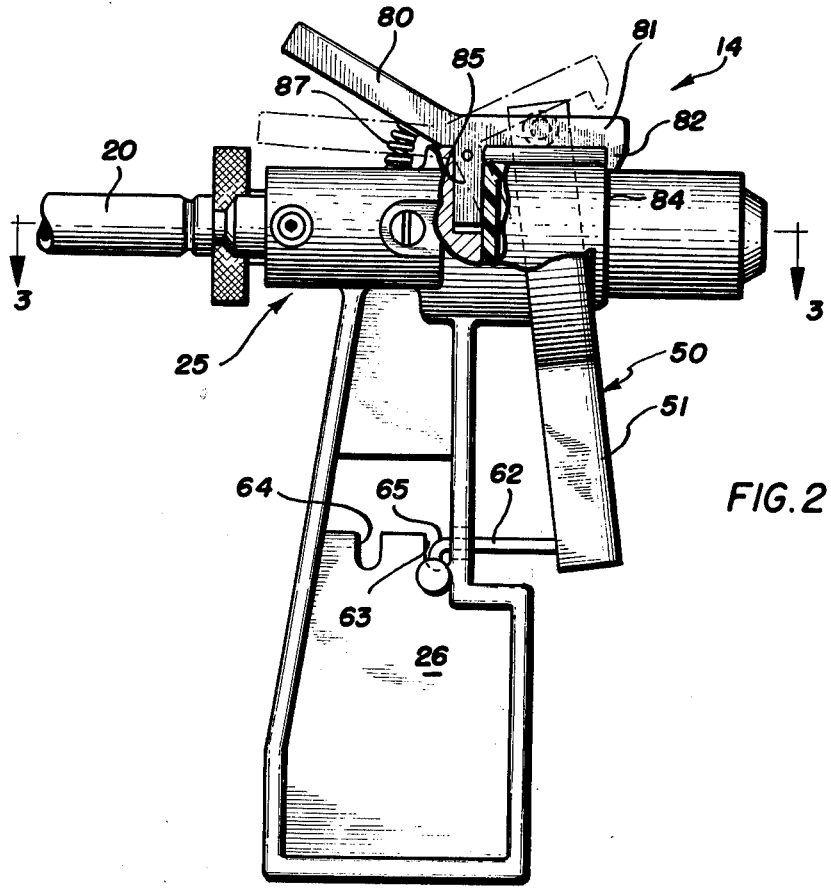
FIG. 2

PURGEABLE DISPENSING GUN FOR POLYURETHANE FOAM AND THE LIKE

This is a continuation-in-part of our application Ser. No. 474,381, filed May 30, 1974, now abandoned.

BACKGROUND OF THE INVENTION

This invention relates generally to apparatus for mixing and dispensing multi-component foam or fluid products, and relates more particularly to purgeable spray guns for urethane foam.

The use of sprayed urethane foams is rapidly expanding in construction, insulation and packaging industries. This relatively inexpensive product has proved to be a highly valuable insulating and packaging material for a number of reasons. Its resiliency, high compressive strength and its excellent dimensional stability make it an excellent packing material for shipping relatively fragile items in cartons where rough handling may be encountered. It has extremely low heat-transmitting properties, making it an excellent insulation material. Relatively extreme temperatures do not greatly affect it. It does not deteriorate rapidly, thus providing a long service life.

Further, urethane foam can be easily prepared and then applied or emplaced in an almost limitless variety of desired locations. The several fluid components of urethane foam are often stored separately, and then are mixed on the job site to create the foaming product. This mixed, foaming product is then discharged or sprayed into a desired location or target area. After application, the foam hardens into a light, strong protective and insulative covering. Devices which have been used with great success in mixing and supplying urethane foam are disclosed in Brooks U.S. Pat. Nos. 3,559,890 and 3,633,795.

Experience has shown that the components of urethane foam can be selected so as to provide a relatively quick-hardening product fluid. After the material is sprayed on or into the target area, foam product solidification begins. Now, this solidification occurs not only in the desired target area, but in residue product which may remain within the dispensing gun after spraying has been stopped. Residue foam product which has hardened inside parts of the gun make gun cleansing and subsequent use difficult. This problem has been met with great success by foam dispensing guns such as those disclosed in Brooks U.S. Pat. Nos. 3,633,795 and 3,784,110. In these devices, the foam gun is provided with a nozzle inside which the foam product constituents are mixed, and from which the mixed foam product is dispensed. After gun use, the nozzle can be removed, and a fresh nozzle installed.

Recently, the use of urethane foam as an insulation and packing material has found increased favor in applications providing target areas of restricted size and shape. When workers are dealing with such restricted target areas, they often find it necessary to spray or apply the foam in an intermittent manner. For example, a layer of foam may be initially applied to the restricted target area, and then foam spraying is halted while the worker inspects the target area; after inspection, another foam layer is applied. In another case, the worker may be forced to temporarily halt foam spraying while either he or a co-worker place an object to be shipped within a carton or other container. After object emplacement, foam applying operations can be resumed. As the container is filled, spraying operations may necessarily again be halted while inspection of the finished packing operation is undertaken. The carton is then closed, is removed, and a new empty carton is placed at the work station for spraying and packing.

Under such circumstances, it may be inconvenient to remove and replace a spray gun nozzle after each short spraying operation. A number of short spraying operations may be required during a single packaging or insulating job, and repeated nozzle replacement can add to costs, and can delay production.

While relatively short time lapses between sprayings can, under some circumstances, be tolerated without foam set-up and gun clogging, time lapses of greater duration permit the fluid constituents to either completely or partially solidify within the gun components, thereby completely or partially clogging the gun. Poor gun performance and an insulation or packing job of degraded quality result. Worker annoyance and hurried efforts can also occur, and can indirectly contribute to a finished product of less than maximum quality.

This problem of partial gun clogging during intermittent spraying operations can be minimized or eliminated by purging those parts of the gun wherein the fluid components are comingled, mixed and discharged with a nonreactive purge fluid. A gun of this general type is shown in U.S. Pat. No. 2,991,015 to Standlick. In addition, purging the gun permits use of fluid components which form a relatively fast-setting product not practically accommodated in other types of guns or dispensing systems.

It is an object of the present invention to provide an improved dispensing gun for mixing and discharging fluids such as urethane foam.

Another object is to provide a fluid mixing and dispensing gun wherein the problem of fluid solidification within the gun can be economically minimized or obviated even when the gun is used intermittently during short, spaced apart periods.

Yet another object is to provide a spray gun which permits purging settable product fluid constituents from important gun parts.

Still another object of the invention is to provide a dispensing and spraying gun for polyurethane foam and like products wherein relatively complete purging of both the nozzle and relatively upstream gun portions is assured. A more specific object is to provide a dispensing gun for urethane foam and like fluids wherein the fluid components and product can be easily and quickly purged from gun valves, the mixing nozzle and other parts thereby obviating clogging.

Yet another object of the invention is to provide a gun for mixing and spraying polyurethane foam and like fluids which can be easily purged when the gun is being used for intermittent spraying, and which is provided with a nozzle member which can be easily removed and quickly replaced after the completion of major-length spraying operations.

A further object is to provide a gun of the described kind which is inexpensive in initial cost, and which can be easily and effectively operated by even inexperienced personnel.

And a further object of the invention is to provide a mixing and dispensing gun for polyurethane and like products wherein interaction of the respective components is positively restricted to a disposable or reconditionable nozzle.

Other objects and advantages of the invention will become apparent upon reading the following detailed

BRIEF DESCRIPTION OF THE DRAWINGS

FIG. 2 is a side elevational view showing in further detail the novel dispensing gun;

FIG. 4 is a fragmentary sectional view similar to FIG. 3 and showing the gun parts as they appear when a purge fluid is being directed through the gun;

FIG. 5 is an exploded view showing in further detail portions of the purge fluid regulating mechanism;

DESCRIPTION OF THE INVENTION

While the invention will be described in connection with a preferred embodiment, it will be understood that is is not intended to limit the invention to that embodiment. On the contrary, it is intended to cover all alternatives, modifications and equivalents as may be included within the spirit and scope of the invention.

Figure 1:
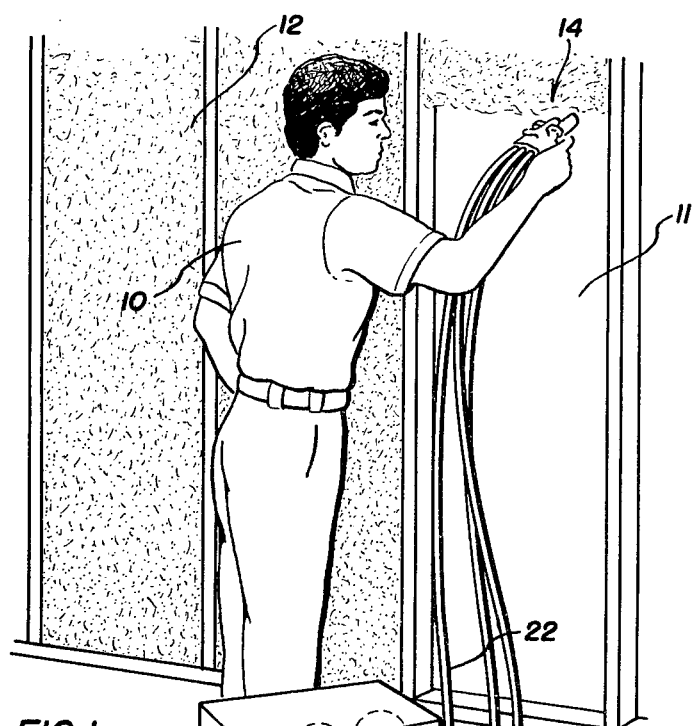
FIG. 1 is a general view showing use of the novel dispensing gun in a typical application.

Turning first to FIG. 1, there is shown a typical embodiment of the present invention in use. A worker 10 is shown spraying a wall surface 11 with a urethane foam product 12 by means of a spray gun 14 embodying the present invention. The fluid components of the urethane foam are stored separately in individual pressurized vessels 16 and 17 which, in turn, may be located for convenience with a carrier 18. The urethane foam components are separately lead to the spray gun 14 by individual connector hoses 19 and 20 where the components are mixed and are then discharged or sprayed against the wall 11 as urethane foam 12.

In accordance with the invention, a relatively inert fluid is discharged through portions of the gun to purge mixed product foam fluid from it after gun use is terminated. This purge fluid can also be conveniently stored in a pressurized vessel 21 which may be mounted or retained within the carrier 18, and is separately lead to the gun 14 by a connector hose 22.

Figure 6:
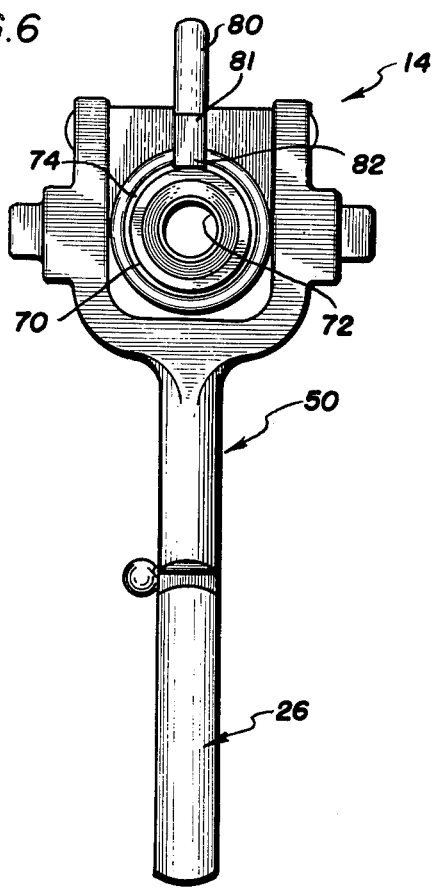
FIG. 6 is a front elevational view of the gun.

As shown in FIGS. 2 and 6, this mixing and discharge spray gun 14 includes a housing 25 from which depends a handle 26 which is formed to encourage easy gun use and deft handling. The product fluid constituent lead-in hoses 19 and 20 are securely attached to the gun housing 25 by interconnector fittings 27 and 28, respectively. In the illustrated embodiment, these fittings 27 and 28 are each formed with grooves 29 and 30 of reduced diameter. The grooves 29 and 30 are engaged by housing lock screw 31 and 32, respectively, which serve to secure the fittings 27 and 28 and their hoses 19 and 20 against axial motion or inadvertent disconnection from the gun 14. Seals such as O-rings 34 or other known devices can be provided to prohibit fluid leakage.

For controlling the flow of each product fluid component through the gun, a plurality of primary valves 37 and 38 intercept and selectively inhibit or permit fluid flow. In the illustrated embodiment, these valves include respective ball members 39 and 40 adapted for fluid-tight engagement with seats 41 and 42 respectively formed in the housing 25. Normally, these balls 39 and 49 are biased into their closed, fluid-flow inhibiting positions; here, this biasing action is accomplished by valve coil springs 43 and 44 interposed between the fittings 27 and 28 and the valve ball members 39 and 40.

Figure 3:
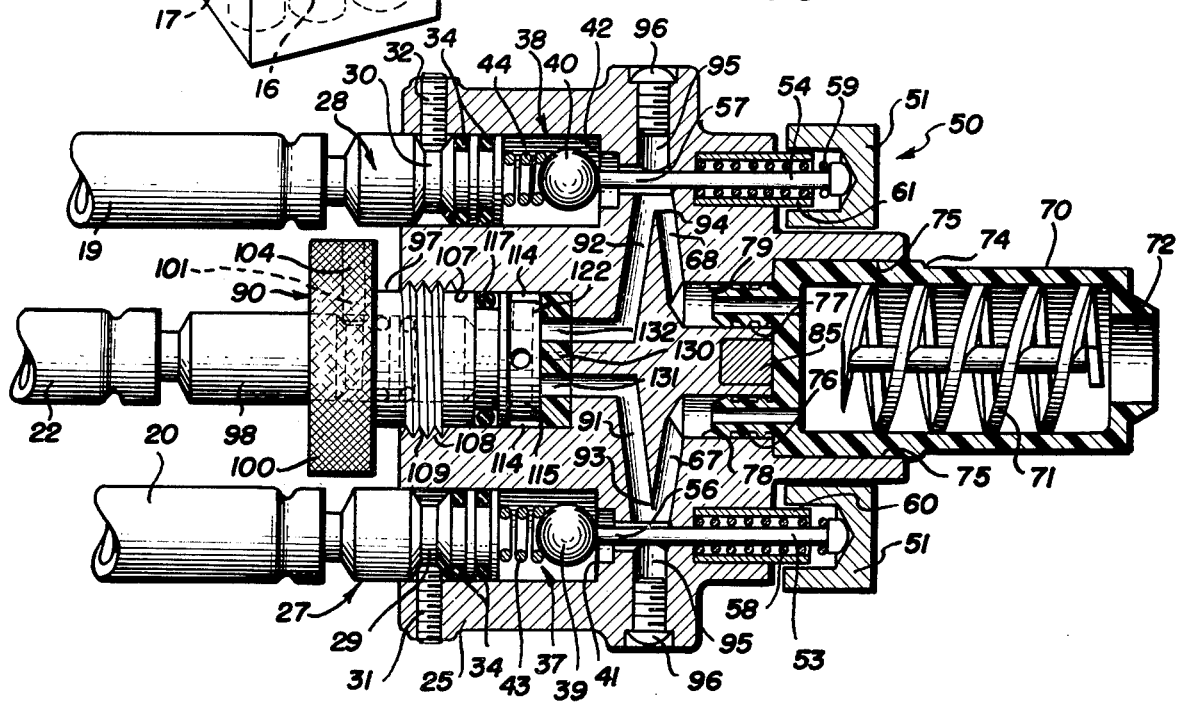
FIG. 3 is a sectional view taken substantially in the plane of line 3—3 in FIG. 2 showing in further detail parts of the dispensing gun as they appear when the gun is discharging a multi-component product fluid.

Simultaneous actuation of these valves 37 and 38 and consequent product fluid component flow is caused by a trigger mechanism 50 as shown in FIGS. 2 and 3. A trigger member 51, conveniently pivoted to the housing 25, is adapted to engage thrust pins 53 and 54 which are mounted for sliding motion in the housing 25. Rear ends 56 and 57 of these pins 53 and 54 are located to engage the valve ball members 39 and 40 and move them from their closed seated positions shown in FIG. 4 to open unseated positions shown in FIG. 3. When pressure on the trigger 51 is released, biasing devices such as compression coil springs 58 and 59 draw the pins 53 and 54 away from the valve ball members 30 and 40 and permit the balls to relocate against the seats 41 and 42. Guide collars 60 and 61 can be provided to insure smooth spring, trigger and valve action.

As shown particularly in FIG. 2, a trigger keeper 62 can be included if desired to retain the trigger and associated valves in either a closed position interdicting fluid flow as illustrated or, alternatively, in an open position permitting fluid flow. This is accomplished by providing recesses 63 and 64 in the gun handle 26. A leg portion 65 of the keeper 62 is adapted to be disposed within either of these recesses 63 and 64 and to retain the attached trigger 51 in the corresponding location.

Downstream from the valves 37 and 38 are primary passages 67 and 68. These passages, here formed in the housing 25, establish separate fluid pathways between each primary valve 37 and 38 and a mixing and discharge nozzle member 70 (FIG. 3). To encourage thorough mixing of the separately received product fluid constituents, a helically shaped baffle member 71 is provided within the nozzle 70. Component mixing and positive product fluid discharge is further encouraged by a nozzle orifice 72 which is sized to permit a free or ready flow of product fluid through the nozzle with sufficient velocity to create a relatively well-defined, easily directed stream.

It is a feature of the invention that this nozzle member 70 can be quickly removed from the gun and a fresh replacememt nozzle easily installed when desired. To this end, the illustrated nozzle 70 is provided with a somewhat enlarged bayonet base 74 adapted to mate with a bayonet recess 75 formed in the housing 25. Nozzle extensions 76 and 77 are adapted to be matingly inserted into receiving parts 78 and 79 and to form fluid-tight connections therewith. Thus, product fluid constituents flowing from the valves 37 and 38 flow down the primary passages 67 and 68, through the extensions 76 and 77, and comingle with the interior of the nozzle member 70. Positive constituent mixing action is encouraged by the helical baffle member 71, and the mixed, foaming fluid is discharged through the nozzle orifice 72 toward the target area.

To securely retain the nozzle member 70 and to assist in its replacement in the gun when desired, a nozzle ejector-retainer lever mechanism 80 is provided as illustrated in FIG. 2. The lever mechanism 80 is provided with a first extension 81 terminating in a hook 82 which is adapted to engage an annular collar 84 partially defining the enlarged bayonet base 74 of the nozzle 70. Interaction of the hook 82 and collar 84 prevent accidental ejection of the nozzle from the gun when nozzle removal is not desired. A second lever extension 85 is adapted to engage the rear of the nozzle member 70 as illustrated in FIGS. 2 and 3. Pivotal motion of the ejector-retainer lever 80 from the position shown in solid lines in FIG. 2 to that shown in dotted lines causes the second lever extension 85 to move forward and forcibly eject the nozzle 70 from the gun housing 25. The lever 80 is normally retained in its nozzle-retaining position by a biasing means such as a coil spring 87 conveniently mounted atop the gun housing 25.

In accordance with the invention, the primary passages 67 and 68 and at least portions of the nozzles 70 can be purged of constituent and mixed product fluid. To this end, a secondary valve 90 is provided for controlling the flow of a purge fluid into the gun, and secondary passages 91 and 92 establish purge fluid pathways between the secondary valve 90 and respective primary passages 67 and 68. By this arrangement, the purge fluid is caused to flow through at least portions of each primary passage 67 and 68 and the nozzle 70 in purging the gun, and extensive, positive purging is encouraged. The purge fluid is preferably compressed air, nitrogen or some other inert fluid which will not react with the product fluid, the product fluid constituents, or gun parts.

It is a feature of the invention that the secondary passages 91 and 92 intersect the primary passages 67 and 68 at respective points 93 and 94 adjacent the primary valves 37 and 38. Purge fluid is thus routed past the primary valves 37 and 38 to discourage valve clogging and consequent gun malfunction. Formation of both the primary passages 67 and 68 and the secondary passages 91 and 92 can be conveniently accomplished by drilling them through work recesses 95. After passage formation is completed, these recesses 95 can be closed off by cap screws 96.

It is a feature of the invention that the secondary or purge fluid valve 90 can be controlled independently of the gun trigger even though the operator may still hold the gun handle 26 and trigger mechanism 21 in one hand. To this end, the illustrated valve 90 includes a hollow quill member 97 which is adapted for connection to the purge fluid hose 22. As illustrated in FIGS. 3, 4 and elsewhere, this hose-quill interconnection is accomplished by providing a hose fitting 98 with a groove 99 of restricted diameter. On an enlarged portion 100 of the quill 97, a lock screw 101 is provided to intercept and engage the groove 99. One or more O-rings 102 provide fluid-tight interconnection between the quill 97 and the fitting 98. The enlarged quill portion 100 is here knurled to make quill rotation and secondary valve operation easy.

The quill 97 and a quill-receiving housing well 107 are provided with mating threads 108 and 109. When the quill 97 is turned about its axis relative to the housing 25, insertion of the quill into the housing 25 or alternative partial withdrawal of the quill from the housing occurs.

The quill member 97 is also provided with a bore 111, as best seen in FIG. 4, down which the purge fluid can pass. Adjacent an end face 112 of the quill, a plurality of radially oriented passages 113 permit flow of the purge fluid out of the quill member 97 and into an annular chamber 114 between a reduced-diameter quill tip 115 and the housing well 107. An O-ring 117 is provided to prohibit purge fluid from flowing backwards out of the housing past the quill member.

In a bottom 118 of the housing well 107, one or more orifices 120 and 121 permit purge fluid flow from the chamber 114 to the secondary passages 91 and 92 as shown by the arrows A in FIG. 4. However, when the quill member 97 is fully inserted into the housing well, purge fluid is prohibited from flowing through the orifices 120 and throughout the gun by sealing abutment of the quill face 112 against the well bottom 188, as shown in FIG. 3. By opening the quill 97 an appropriate amount, purge fluid can flow freely through the gun and drive out the purged material without creating more than a relatively low back pressure in the nozzle 70 behind the dispensing orifice 72.

It is a feature of the invention that wear and tear on the well bottom 118 is inhibited and purge fluid flow encouraged by a washer member 130 adapted to be retained in the well bottom 118. Here, this washer member 130 is provided with orifices 131 and 132 adapted to align with the housing secondary passage orifices 120 and 121 to permit purge fluid to pass from the quill and well into the secondary passages 91 and 92. The washer 130 is retained in the housing well 118 in its orifice-aligned position by one or more alignment pins 135 which extend between pin-receiving recesses 136 in the housing 25 and pin-receiving recesses 137 in the washer 130 itself. To extend the service life of the gun 14, this washer 130 is formed of a polytetrafluoroethylene material which is inert with respect to the purge fluid and each product fluid component.

The described construction of the spray gun makes its use easy by even inexperienced personnel. Each product fluid constituent is lead to the gun along separate product fluid constituent flow paths by the individual hoses 19 and 20. Flow of each product fluid constituent is controlled by a valve means 37 or 38. Each fluid constituent passing the valve 37 or 38 flows down a separate primary passage 67 or 68 to the common mixing and dispensing nozzle chamber 70. This nozzle and the gun itself are adapted to accurately direct the mixed foaming product to a target area. After gun use and when the gun will not be in use for a short time, a secondary valve 90 is opened by turning the knurled portion 100 of the quill 97. Purge fluid flows down secondary passages 91 and 92, past the primary valves 37 and 38, and into the primary passages 67 and 68 to drive out the product fluid constituents from the primary passages and from the nozzle itself, thereby purging the gun even when a relatively fast-setting product foam is formed by the fluid constituents. If the gun will not be used for relatively long periods of time, the nozzle 70 can be removed from the gun, thereby eliminating the possibility that any unpurged foam product could flow backwards into upstream portions of the gun. When gun use is again desired, a fresh nozzle can be installed.

Figure 7:
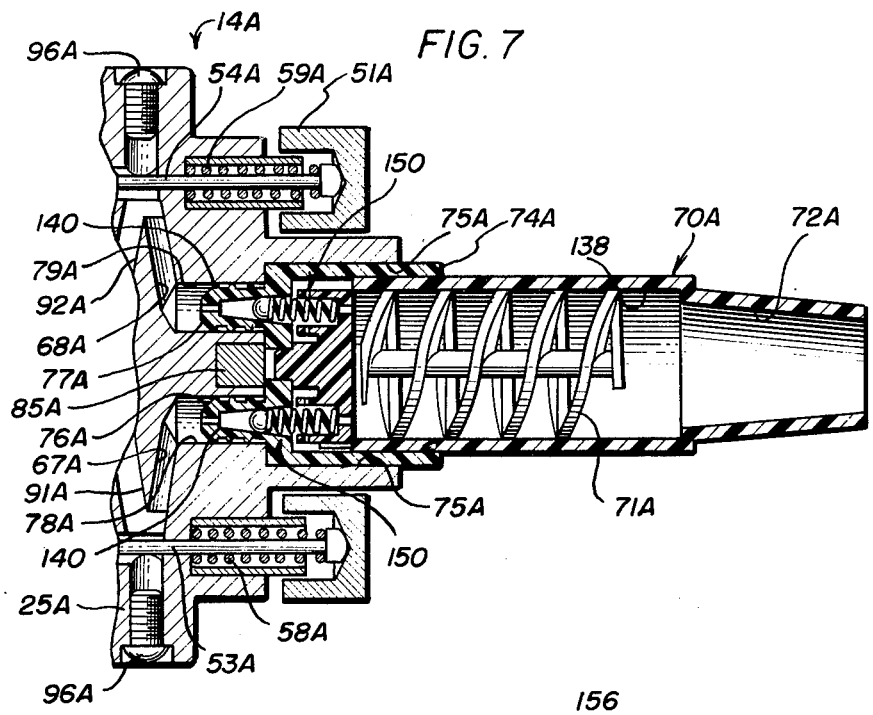
FIG. 7 is a central sectional view similar to FIG. 3 but showing a modified form of the invention wherein interaction of the fluid components is restricted positively to the nozzle.
Figure 8:
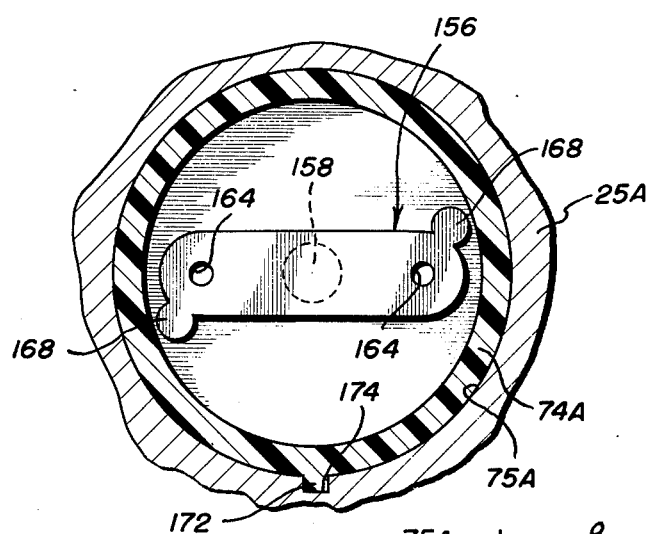
FIG. 8 is a sectional view taken along the line 8 — 8 of FIG. 9 to show the check valve retainer.
Figure 9:
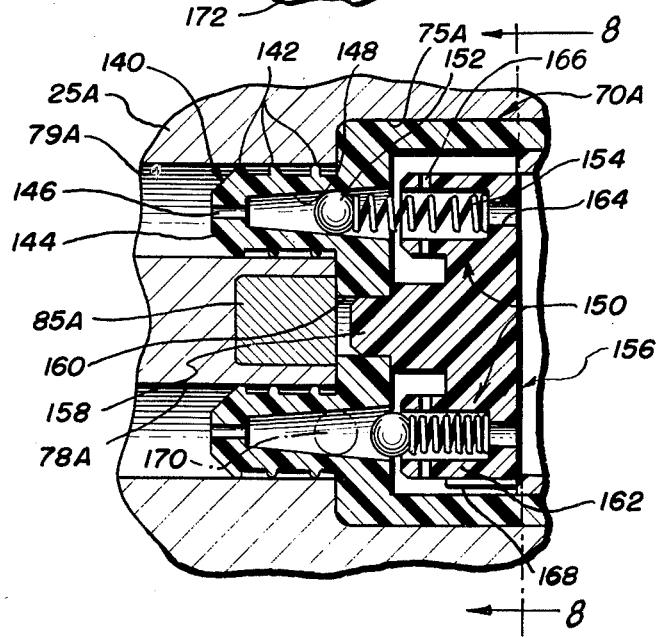
FIG. 9 is a view similar to the showing of FIG. 7 but suggesting one of the check valves in open condition as might occur on plugging of the opposite line.

While a particular embodiment of the invention has been thus far shown and described, it should be understood, of course, that the invention is not limited thereto since many modifications may be made. Therefore and in order to enhance the understanding of the invention, one such modified form of the invention is shown in FIGS. 7–9 inclusive. Because the embodiment of FIGS. 7–9 incorporates many of the elements employed in the embodiment of FIGS. 1–6, like numerals have been used to designate like parts with the suffix letter "A" being employed to distinguish those common elements associated with the embodiment of FIGS. 7–9.

The embodiment of FIGS. 7–9 is characterized by the provision of check valves within the nozzle 70A for use is selectively admitting fluid product constituents into a mixing chamber portion 138 of the nozzle 70A and, more importantly, for obstructing retrograde flow. Provision of check valves of the type to be described hereinafter positively restricts physical and chemical interaction of the product constituents to a separate nozzle member which may be discarded or reconditioned. The check valves thus prevent one product constituent from leaking across the nozzle and into the companion product constituent passage and plugging up the gun 14A, as might otherwise be experienced upon loss of pressure in one constituent line only or a change in the evenness of the trigger pull, for example. Thus, while it is not possible to inspect the gun system visually, the described check valve arrangement confines problems arising from parts failure and resulting in constituent interaction, to the nozzle which can be removed for troubleshooting purposes.

The check valve arrangement to be described also allows different pressures to be used on the various product constituent lines while maintaining a preselected stoichiometric ratio of the constituents themselves. Viscosity variables in the product constituents may also be accommodated by proper design of the check valves of the invention.

Referring particularly to FIG. 7 and with secondary reference to FIGS. 8 and 9, the nozzle 70A is constructed to include a helically configurated static mixing member 71A disposed in the mixing chamber 138 spaced flowpathwise downstream from a pair of tubulations 140. The tubulations 140 are intended to fittingly engage the bores 78A and 79A and are, for this purpose, provided with a plurality of annular sealing ribs 142, best seen in FIG. 9. Each of the tubulations 140 is fashioned with a conically tapered tip 144 for facility in inserting the tubulation into the appropriate bore in the gun housing. The tip 144 of each tabulation 140 is centrally apertured with a cylindrical hole 146 which establishes an inlet for the product fluid constituent, the hole 146 opening into an internal bore 148. The bore 148 is conically tapered to flare outwardly in the direction of mixing chamber 138 to establish a valve seat in a check valve arrangement 150.

It is to be appreciated that an important feature of the present invention resides in the provision of check valve arrangements 150 as an integral part of the nozzle 70A; and in addition to the valve seat defined by the conically tapering bore 148, each check valve arrangement 150 includes a valve ball 152 which is disposed between the valve seat and a coiled biasing spring 154. The strength of the spring 154 is selected to urge the valve ball 152 into a position in the conical valve seat of bore 148 normally closing off communication through the corresponding tabulation 140, the strength of spring 154 being additionally selected to respond to fluid pressure in the tubulation so as to locate the valve ball in a position selectively opening the tubulation to product constituent flow.

In order to establish a preselected positional relationship between the valve ball 152 and the biasing spring 154 relative to the valve seat defined by bore 148, the nozzle 70A includes a retainer 156, best seen in FIGS. 8 and 9. A solid cylindrical, centrally disposed, upstream facing stem 158 extends from the body of retainer 156 to enter a matching bore 160 in the nozzle base for fixing the retainer in position; and if desired, a film of adhesive may be disposed between the stem and the bore 160 to preserve the assembled relationship. Outboard of the stem 158, a pair of parallel, tubular stem members 162 extend toward the tubulations 140 in axial alignment therewith. The members 162 communicate through cylindrical apertures 164 formed therein, the apertures 164 passing the respective product constituents through the retainer and into the mixing chamber 138. The members 162 are also provided with radial bores 166 to provide supplementary means for egress of the fluid product constituents. Locating ears 168 may additionally be included on the retainer 156 for supplemental aid in mounting and positioning the same.

It is to be appreciated that the check valves 150 operate independently of each other and in response to the respective biasing spring and product constituent pressures. As is suggested in FIG. 9, one valve ball 152 may be inadvertently seated so as to close off the corresponding tabulation 140 while the companion valve ball is urged by product fluid pressure from its seated condition indicated in broken outline at 170 to a position, shown in solid outline, opening its corresponding tubulation and admitting the corresponding fluid product constituent into the mixing chamber 138. Such a condition is prevented from leaking constituent from bore 78A to bore 79A by the closed check valve. Any product constituent interaction is thus restricted to the nozzle 70A.

The nozzle base advantageously includes an axial locating rib 172 which fits into a groove 174 in the gun housing for aligning the tubulations 140 with the bores 78A and 79A.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation.

The invention is claimed as follows:

1. A system for mixing and dispensing a product fluid comprising: containers for separately stored constituents; a gun housing with conduit means connected to said containers; product constituent passages and primary valves in said gun housing, said primary valves being operable to control constituent flow though said passages; actuator means in the gun housing for selectively operating said primary valves to control the flow of corresponding fluid product constituents into the gun housing; replaceable nozzle means mounted in said gun housing for receiving and mixing the product constituents and for dispensing the resultant mixed product, including a mixing chamber having a dispensing orifice, a pair of product constituent tabulations opening individually into said chamber away from said orifice and having coupling means connected to a corresponding product constituent passage in said gun housing, and check valve means mounted in said nozzle means flowpathwise between each of said tabulations and said mixing chamber for selectively admitting the corresponding fluid product constituent into said chamber and for obstructing retrograde flow of any mixed product or product constituent to the gun housing; said nozzle means with the included check valve means being bodily removable as a unit from the gun housing independently of the primary valves for permitting repair, replacement or cleaning of the nozzle means.

2. A system according to claim 1 wherein each of said check valve means comprises a valve seat, a valve ball confronting said seat and biasing means for urging said ball toward said seat and into a position normally closing the corresponding tubulation, said biasing means being responsive to fluid pressure in the tubulation for locating said ball in a position selectively opening the tubulation to product constituent flow.

3. A system according to claim 2 which further includes retainer means fixed in said nozzle means for preserving a preselected positional relationship between said valve ball and biasing means and said valve seat.

4. A disposable nozzle arrangement adapted for removable attachment to a dispensing gun housing for use in mixing and dispensing a product fluid having separate constituents, comprising: a nozzle body including a mixing chamber and having a dispensing orifice; a pair of tubulations opening into said chamber away from said orifice and having coupling means adapted for connecting said nozzle arrangement to a dispensing gun housing having communication with a product constituent supply; and a check valve means mounted flowpathwise between each of said tubulations and said mixing chamber for selectively admitting the corresponding fluid product constituent into said chamber for mixing the constituents and for obstructing retrograde flow of the constituents, with the coupling means permitting removal of the nozzle arrangement with the included check valves means as a unit from an attached dispensing gun housing.

5. A nozzle arrangement according to claim 4 wherein each of said check valve means comprises a valve seat, a valve ball confronting said seat and biasing means for urging said ball toward said seat and into a position normally closing the corresponding tubulation, said biasing means being responsive to fluid pressure in the tubulation for locating said ball in a position selectively opening the tubulation to product constituent flow.

6. A nozzle arrangement according to claim 5 further including retainer means fixed in said nozzle means for preserving a preselected positional relationship between said valve ball and biasing means and said valve seat.

7. A nozzle arrangement according to claim 4 which further comprises a static mixing member in said chamber.

* * * * *

UNITED STATES PATENT AND TRADEMARK OFFICE
CERTIFICATE OF CORRECTION

PATENT NO. : 4,117,551
DATED : September 26, 1978
INVENTOR(S) : William R. Brooks and Irving C. Heinzel It is certified that error appears in the above-identified patent and that said Letters Patent are hereby corrected as shown below:

```
On the frontispiece under United States Patent
"Books et al" should be --Brooks et al--;
Col. 1, line  9, before "fluid" insert --like--;
Col. 1, line 34, "supplying" should be --applying--;
Col. 3, line 45, "with" should be --within--;
Col. 4, line 26, "30" should be --39--;
Col. 4, line 64, "with" should be --within--;
Col. 6, line  1, "quili member 91" should be --quill member
                    97--;
Col. 6, line 11, after "fluid" insert --to--;
Col. 6, line 17, "188" should be --118--;
Col. 7, line 10, "is" should be --in--;
Col. 7, line 47, "tabulations" should be --tubulations--;
Col. 7, line 64, "tabulations" should be --tubulations--;
Col. 8, line 64, "tabulations" should be --tubulations--;
Col. 9, line  1, "tabulations" should be --tubulations--.
```

Signed and Sealed this

Thirteenth Day of March 1979

[SEAL]

Attest:

RUTH C. MASON
Attesting Officer

DONALD W. BANNER
Commissioner of Patents and Trademarks